US008974637B2

(12) United States Patent
Simonson

(10) Patent No.: US 8,974,637 B2
(45) Date of Patent: Mar. 10, 2015

(54) PROCESS FOR THE PRODUCTION OF PAPER AND BOARD

(75) Inventor: Patrik Simonson, Savedalen (SE)

(73) Assignee: Akzo Nobel Chemicals International B.V., Amersfoort (NL)

(*) Notice: Subject to any disclaimer, the term of this patent is extended or adjusted under 35 U.S.C. 154(b) by 0 days.

(21) Appl. No.: 14/124,505

(22) PCT Filed: Jun. 5, 2012

(86) PCT No.: PCT/EP2012/060541
§ 371 (c)(1),
(2), (4) Date: Dec. 6, 2013

(87) PCT Pub. No.: WO2012/168204
PCT Pub. Date: Dec. 13, 2012

(65) Prior Publication Data
US 2014/0124154 A1    May 8, 2014

Related U.S. Application Data

(60) Provisional application No. 61/494,475, filed on Jun. 8, 2011.

(30) Foreign Application Priority Data

Jun. 8, 2011 (EP) .................................. 11169107

(51) Int. Cl.
| D21F 11/00 | (2006.01) |
| D21H 17/69 | (2006.01) |
| D21H 17/24 | (2006.01) |
| D21H 17/28 | (2006.01) |
| D21H 17/29 | (2006.01) |
| D21H 17/25 | (2006.01) |
| D21H 17/45 | (2006.01) |
| D21H 17/00 | (2006.01) |
| D21H 17/37 | (2006.01) |
| D21H 17/44 | (2006.01) |
| D21H 17/55 | (2006.01) |
| D21H 17/56 | (2006.01) |
| D21H 17/66 | (2006.01) |
| D21H 17/67 | (2006.01) |
| D21H 17/68 | (2006.01) |
| D21H 23/04 | (2006.01) |
| D21H 23/06 | (2006.01) |
| D21H 23/12 | (2006.01) |
| D21H 21/10 | (2006.01) |

(52) U.S. Cl.
CPC .............. *D21H 17/74* (2013.01); *D21H 17/25* (2013.01); *D21H 17/28* (2013.01); *D21H 17/37* (2013.01); *D21H 17/375* (2013.01); *D21H 17/44* (2013.01); *D21H 17/55* (2013.01); *D21H 17/56* (2013.01); *D21H 17/66* (2013.01); *D21H 17/67* (2013.01); *D21H 17/675* (2013.01); *D21H 17/68* (2013.01); *D21H 23/04* (2013.01);

*D21H 23/06* (2013.01); *D21H 23/12* (2013.01); *D21H 17/69* (2013.01); *D21H 21/10* (2013.01)
USPC ............ 162/198; 162/164.1; 162/164.6; 162/168.2; 162/177; 162/181.2; 162/181.6; 162/183; 162/158; 162/175; 700/127

(58) Field of Classification Search
CPC ..... D21H 17/24; D21H 17/68; D21H 17/375; D21H 17/56; D21H 17/67; D21H 17/675; D21H 17/29; D21H 17/66; D21H 17/69; D21H 17/44; D21H 21/10; D21H 23/04; D21H 17/55; D21H 17/25; D21H 17/28; D21H 17/37; D21H 23/06; D21H 23/12; D21H 17/45; D21H 17/74
USPC ............. 162/158, 164.1, 164.6, 168.1–168.3, 162/175–178, 181.1–181.3, 181.6–181.8, 162/183, 198; 700/127–129
See application file for complete search history.

(56) References Cited

U.S. PATENT DOCUMENTS

| 4,047,029 | A | * | 9/1977 | Allport ........................... 378/90 |
| 4,174,998 | A | * | 11/1979 | Shiel ........................... 162/168.3 |
| 4,272,297 | A | * | 6/1981 | Brooks et al. .................. 106/465 |
| 4,940,785 | A | | 7/1990 | Stober et al. |
| 4,943,349 | A | * | 7/1990 | Gomez ........................... 162/158 |

(Continued)

FOREIGN PATENT DOCUMENTS

| EP | 0 227 465 A1 | 7/1987 |
| EP | 2 325 388 A1 | 5/2011 |
| EP | 2362016 A2 * | 8/2011 |
| EP | 2662416 A1 * | 11/2013 |
| WO | WO 99/27182 A1 | 6/1999 |

(Continued)

OTHER PUBLICATIONS

European Search Report dated Aug. 22, 2011 for related EP Application No. 11169107.7.

(Continued)

*Primary Examiner* — Jose Fortuna
(74) *Attorney, Agent, or Firm* — Alice C. Su

(57) ABSTRACT

The present invention relates to a process for the production of paper and board which comprises: (a) introducing one or more fillers, one or more anionic polysaccharides and one or more cationic agents into a mixing zone to form a filler composition; (b) introducing by means of a pump the filler composition into an aqueous suspension comprising cellulosic fibers; and (c) dewatering the obtained suspension. The present invention also relates to a process for the production of a filler composition which comprises: (a) introducing one or more fillers, one or more anionic polysaccharides and one or more cationic agents into a mixing zone to form a filler composition; (b) introducing by means of a pump the filler composition into a storage tank.

24 Claims, No Drawings

(56) References Cited

U.S. PATENT DOCUMENTS

| | | | |
|---|---|---|---|
| 5,009,748 A * | 4/1991 | Balakrishnan et al. | 162/198 |
| 5,017,268 A * | 5/1991 | Clitherow et al. | 162/146 |
| 5,176,891 A | 1/1993 | Rushmere | |
| 5,458,679 A * | 10/1995 | Fairchild | 106/465 |
| 6,993,408 B2 * | 1/2006 | Puurtinen | 700/128 |
| 7,407,562 B2 * | 8/2008 | Heikkinen et al. | 162/198 |
| 8,157,962 B2 * | 4/2012 | Simonson et al. | 162/181.2 |
| 8,414,739 B2 * | 4/2013 | Kimura et al. | 162/168.3 |
| 2003/0127209 A1 * | 7/2003 | Sandberg et al. | 162/164.6 |
| 2003/0216828 A1 * | 11/2003 | Puurtinen | 700/128 |
| 2006/0118259 A1 * | 6/2006 | Heikkinen et al. | 162/198 |
| 2009/0020250 A1 * | 1/2009 | Kimura et al. | 162/164.6 |
| 2009/0162642 A1 | 6/2009 | Ono et al. | |
| 2010/0032117 A1 * | 2/2010 | Simonson et al. | 162/181.2 |
| 2010/0186917 A1 * | 7/2010 | Simonson et al. | 162/175 |
| 2011/0284178 A1 * | 11/2011 | Shakespeare | 162/198 |

FOREIGN PATENT DOCUMENTS

| | | | |
|---|---|---|---|
| WO | WO 2005/124021 A1 | | 12/2005 |
| WO | WO 2006100996 A1 * | | 9/2006 |
| WO | WO 2009/010483 A2 | | 1/2009 |
| WO | WO 2009010483 A2 * | | 1/2009 |
| WO | WO 2012168204 A1 * | | 12/2012 |

OTHER PUBLICATIONS

International Search Report and Written Opinion dated Jul. 13, 2012 for related PCT Application No. PCT/EP2012/060541.

International Preliminary Report on Patentability dated Jul. 16, 2013 for related PCT Application No. PCT/EP2012/060541.

Iler et al., "Degree of Hydration of Particles of Colloidal Silica in Aqueous Solution," J. Phys. Chem. 60 (1956), pp. 955-957.

Sears et al., "Determination of Specific Surface Area of Colloidal Silica by Titration with Sodium Hydroxide," Analytical Chemistry 28 (1956), No. 12, pp. 1981-1983.

T 569 om-09—"Internal bond strength (Scott type)," (revision and expansion of previous TAPPI T 833 pm-94), TAPPI 2009, pp. 1-8.

ISO 536—"Paper and boad—Determination of grammage," Second edition Sep. 1, 1995.

ISO 1924-2—"Paper and board—Determination of tensile properties—Constant rate of elongation method," Third edition Dec. 15, 2008.

ISO 1924-3—"Paper and board—Determination of tensile properties—Constant rate of elongation method," First edition Jul. 1, 2005.

* cited by examiner

PROCESS FOR THE PRODUCTION OF PAPER AND BOARD

This application is a national stage filing under 35 U.S.C. §371 of PCT/EP2012/060541, filed Jun. 5, 2012, which claims priority to European Patent Application No. 11169107.7, filed Jun. 8, 2011, and U.S. Provisional Patent Application No. 61/494,475, filed on Jun. 8, 2011, the contents of which are incorporated herein by reference in their entirety.

FIELD OF THE INVENTION

The present invention relates to a process for the production of paper and board. More specifically, the invention relates to a process for the production of a filler composition suitable for use in paper and board making processes, and a process for the production of paper and board in which a filler composition is introduced into a cellulosic suspension.

BACKGROUND OF THE INVENTION

Fillers and filler compositions are well known and widely used in paper making applications in order to reduce paper costs by replacing relatively expensive virgin cellulosic fibers by less expensive filler. Fillers also make it possible to improve certain paper properties such as, for example, surface smoothness, printability and optical properties like opacity and brightness. However, other paper properties may be adversely affected. For instance, filled paper usually exhibit lower strength properties compared to unfilled paper.

Filled paper is conventionally produced to meet a certain specification, e.g. tensile strength, tensile stiffness, Scott Bond, thickness, grammage, filler content, etc. When producing paper at a specified grammage, it has been observed that the paper thickness is reduced when the filler content is increased. Paper thickness out of specification may give rise to handling problems, for example in high-speed conversion and end-use operations.

A thickness reduction in the filled paper may be compensated by increasing the grammage, i.e. increasing the amount of cellulosic fibre and filler used in the process in the proportions according to the specification, meaning that the overall production costs will increase. A thickness reduction may also be compensated by replacing part of the regular sulphate/sulphite pulps by bulky pulps, e.g. BCTMP (bulky CTMP). However, there may be drawbacks and problems associated with the use of such pulps.

Accordingly, there is still a need for processes for the production of filled paper and board with improved thickness control, improved runnability in high-speed conversion and end-use operations, and improved or maintained strength properties. There is also a need for processes for producing filler compositions which impart the above properties and advantages to paper and board.

SUMMARY OF THE INVENTION

It is an object of the present invention to provide a process for the production of paper and board with improved thickness control, i.e. maintained thickness or at least reduced loss of thickness, in particular when increasing the filler content of the paper and board produced. It is another object of the invention to provide a process for the production of filled paper and board which have improved runnability in high-speed conversion and end-use operations. Hereby it is possible to avoid or at least reduce any handling and runnability problems caused by the paper thickness being out of specification, e.g. double feeds or jams in copiers, reduced operating speed in forms presses and other converting machines, and registration errors on printing and envelope-folding machines.

It is still another object of the invention to provide a process for the production of filled paper and board which have maintained or improved strength properties, in particular when increasing the filler content of the paper and board produced. Strength properties of filled paper and board produced by the invention that may be substantially maintained or improved include tensile strength, tensile stiffness, bending resistance, z-strength, Scott Bond and wax pick.

It is yet another object of the invention to provide a process for the production of paper and board in which the content of filler and the proportion of filler to other components present in a filler composition can be easily adjusted in response to any thickness deviation, e.g. deviation from the thickness specification, to provide filled paper and board having a thickness within the specification and maintained or improved strength properties.

By using the invention it is possible to reduce the fibre content and increase the filler content of paper and board while obtaining improved thickness control and maintained or increased strength properties of the paper or board produced. Paper thickness out of specification may give rise to handling problems, for example in high-speed conversion and end-use operations. Examples of such problems include double feeds or jams in copiers, reduced operating speed in forms presses and other converting machines, and registration errors on printing and envelope-folding machines.

Hereby it is possible to reduce virgin cellulosic fibre usage, increase filler loadings while maintaining the strength properties and to provide an improved paper and board making process, which leads to environmental and economic benefits.

It is still another object of the invention to provide a method for the production of a filler composition which is suitable for use in paper and board making processes in which the proportion of filler to other components present in a filler composition can be easily adjusted.

Accordingly, in one aspect, the present invention relates to a process for the production of paper and board which comprises:

(a) introducing one or more fillers, one or more anionic polysaccharides and one or more cationic agents into a mixing zone to form a filler composition;

(b) introducing by means of a pump the filler composition into an aqueous suspension comprising cellulosic fibres; and (c) dewatering the obtained suspension.

In another aspect, the present invention relates to a process for the production of a filler composition which comprises:

(a) introducing one or more fillers, one or more anionic polysaccharides and one or more cationic agents into a mixing zone to form a filler composition;

(b) introducing by means of a pump the filler composition into a storage tank.

These and other objects and aspects of the invention will be described in further detail hereinafter.

DETAILED DESCRIPTION OF THE INVENTION

The present invention comprises the use of one or more fillers. The term "filler", as used herein, is meant to include synthetic and natural mineral fillers and pigments, including porous, bulky, plastic and expandable fillers and pigments. Examples of suitable fillers according to the invention include wollastonites, kaolinites, e.g. kaolin, china clay, calcined clay, titanium dioxide, gypsum, talcites, e.g. talc, hydrotalcite, manasseite, pyroaurite, sjögrenite, stichtite, barbertonite, takovite, reevesite, desautelsite, motukoreaite, wermlandite, meixnerite, coalingite, chloromagalumite, carrboydite, honessite, woodwardite, iowaite, hydrohonessite and mountkeithite, silicas, e.g. precipitated silica and precipitated alumino silicates, smectites, e.g. montmorillonite/bentonite, hectorite, beidelite, nontronite and saponite, hydrogenated aluminum oxides (aluminum trihydroxides), calcium sulphate, barium sulphate, calcium oxalate, as well as natural and synthetic calcium carbonates. Examples of suitable natural and synthetic calcium carbonates include chalk, ground marble, ground calcium carbonate (GCC) and precipitated calcium carbonate (PCC), including any of the various crystalline forms or morphologies that exist, e.g. calcite of rhombohedral, prismatic, tabular, cuboid and scalenohedral forms and aragonite of acicular form. The one or more fillers are suitably selected from kaolin, calcium carbonate, e.g. ground calcium carbonate and precipitated calcium carbonate, and mixtures thereof. The one or more fillers are suitably used in the form of an aqueous slurry.

The present invention comprises the use of one or more anionic polysaccharides. Suitably the one or more anionic polysaccharides are water-dispersable or water-soluble, preferably water-soluble or at least partly water-soluble. The one or more anionic polysaccharides are suitably used in the form of an aqueous composition. The one or more anionic polysaccharides contain anionic groups, which can be native and/or introduced by chemical treatment of the polysaccharide. Examples of native anionic polysaccharides include native potato starch, which contains a substantial amount of covalently bound phosphate monoester groups. The one or more anionic polysaccharides may also contain cationic groups as long as the polysaccharide is net anionic, or has a net anionic charge, i.e. the number of anionic groups is higher than the number of cationic groups, or the degree of substitution or anionic groups is higher than the degree of substitution or cationic groups. Preferably, the one or more anionic polysaccharides are free or substantially free from cationic groups.

Examples of suitable anionic groups that can be present in the one or more anionic polysaccharides include carboxylate, e.g. carboxyalkyl, sulphate, sulphonate, e.g. sulphoalkyl, phosphate and phosphonate groups in which the alkyl group can be methyl, ethyl propyl and mixtures thereof, suitably methyl; suitably the one or more anionic polysaccharides contain an anionic group comprising a carboxylate group, e.g. a carboxyalkyl group. The counter-ion of the anionic group is usually an alkali metal or alkaline earth metal, suitably sodium. The anionic groups can also exist in their acid form, whereby the corresponding anionic groups are formed in an aqueous environment.

Examples of suitable cationic groups that can be present in the one or more anionic polysaccharides include salts of amines, suitably salts of tertiary amines, and quaternary ammonium groups, preferably quaternary ammonium groups. Examples of suitable anionic polysaccharides containing cationic groups include those obtained by reacting the anionic polysaccharide with a quaternization agent selected from 2,3-epoxypropyl trimethyl ammonium chloride, 3-chloro-2-hydroxypropyl trimethyl ammonium chloride and mixtures thereof.

The one or more anionic polysaccharides of the invention can contain non-ionic groups such as alkyl or hydroxy alkyl groups, e.g. hydroxymethyl, hydroxyethyl, hydroxypropyl, hydroxylbutyl and mixtures thereof, e.g. hydroxyethyl methyl, hydroxypropyl methyl, hydroxybutyl methyl, hydroxyethyl ethyl, hydroxypropoyl and the like. In a preferred embodiment of the invention, the anionic polysaccharide contains both anionic and non-ionic groups.

Examples of suitable anionic polysaccharides of the invention include glucans, e.g. dextrans and celluloses, galactomannans, e.g. guar gums, chitins, chitosans, glycans, galactans, xanthan gums, pectins, mannans, dextrins, alginates and carragenanes. Examples of suitable starches include potato, corn, wheat, tapioca, rice, waxy maize, etc. Preferably, the anionic polysaccharide is selected from cellulose derivatives, preferably anionic cellulose ethers. Examples of suitable anionic polysaccharides and cellulose derivatives include carboxyalkyl celluloses, e.g. carboxymethyl cellulose, carboxyethyl cellulose, carboxy-propyl cellulose, sulphoethyl carboxymethyl cellulose, carboxymethyl hydroxyethyl cellulose ("CM-HEC"), carboxymethyl cellulose wherein the cellulose is substituted with one or more non-ionic substituents, preferably carboxymethyl cellulose ("CMC"). Examples of suitable cellulose derivatives include those disclosed in U.S. Pat. No. 4,940,785, which is hereby incorporated herein by reference.

The one or more anionic polysaccharides usually have a degree of substitution of anionic groups of at least about 0.001 or at least about 0.01, suitably at least about 0.05 or at least about 0.10 and preferably at least about 0.15, and the degree of substitution of anionic groups is usually up to about 1.0 or up to about 0.75, suitably up to about 0.65 or up to about 0.50 and preferably up to about 0.45.

The one or more anionic polysaccharides usually have a weight average molecular weight of at least 2,000 Dalton or at least about 5,000 Dalton, suitably at least 50,000 Dalton or at least about 100,000 Dalton, and the average molecular weight is usually up to about 30,000,000 Dalton or up to about 25,000,000 Dalton, suitably up to about 1,000,000 Dalton or up to about 500,000 Dalton.

The present invention comprises the use of one or more cationic agents. The term "cationic agent", as used herein, is meant to include any cationic organic and inorganic compounds. The term "cationic organic compound", as used herein, is also referred to as a first cationic agent. The term "cationic inorganic compound", as used herein, is also referred to as a second cationic agent.

Suitable cationic organic compounds, or first cationic agents, include water-soluble and water-dispersible, preferably water-soluble cationic organic compounds. The one or more cationic agents are suitably used in the form of aqueous compositions. The cationic organic compound can be synthetic or derived from natural sources and rendered cationic. Examples of suitable cationic organic compounds include cationic organic polymers, e.g. condensation polymers like cationic polyamines, cationic polyamideamines, cationic polyethylene imines and cationic dicyandiamide polymers, cationic vinyl addition polymers of ethylenically unsaturated cationic monomer or monomer blend comprising at least one cationic monomer like cationic acrylamide-based polymers, cationic acrylate-based polymers, cationic vinylamine/vinylformamide-based polymers and cationic polymers based on diallyl dialkyl ammonium chlorides. Examples of suitable ethylenically unsaturated cationic monomers include dialkylaminoalkyl(meth)acrylates and dialkylaminoalkyl(meth)acrylamides, preferably in quaternised form, and diallyl dimethyl ammonium chloride (DADMAC). The cationic polymers of ethylenically unsaturated monomer are usually prepared from about 10 to 100 mole % cationic monomer and 0 to 90 mole % other monomer, the sum of percentages being 100. The amount of cationic monomer is usually at least 80 mole %, suitably 100 mole %. Suitable, the one or more cationic agents comprise a cationic condensation polymer, preferably a cationic polyamine.

The cationic organic compound usually has a weight average molecular weight of at least about 1,000, suitably at least about 2,000 and preferably at least about 5,000. Usually, the weight average molecular weight is up to about 4,000,000, suitably up to about 2,000,000 and preferably up to about 700,000. The charge density of the cationic organic compound is usually at least about 0.2 meq/g, suitably at least about 1 meq/g, and the charge density is usually up to about 15 meq/g, suitably up to about 10 meq/g.

Examples of suitable cationic inorganic compounds, or second cationic agents, include inorganic mono-, di- and polyvalent cations and polyelectrolytes, e.g. aluminum compounds. Examples of suitable aluminum compounds include alum (aluminum sulphate), aluminates, e.g. sodium and potassium aluminates, and polyaluminum compounds, e.g. polyaluminum chlorides, polyaluminum sulphates, polyaluminum silicate sulphates and mixtures thereof. Suitably, the one or more cationic agents comprise a polyaluminum compound, preferably a polyaluminum chloride.

The one or more cationic agents of the invention suitably comprise at least one cationic organic compound, or first cationic agent, as defined above and one cationic inorganic compound, or second cationic agent, as defined above. Examples of suitable combinations of cationic organic and inorganic compounds include cationic organic polymers and polyaluminum compounds, suitably a cationic condensation polymer and a polyaluminum compound, and preferably cationic polyamine and polyaluminum chloride.

The process of this invention comprises introducing the one or more fillers, the one or more anionic polysaccharides and the one or more cationic agents into a mixing zone to form a filler composition, and then pumping the filler composition into an aqueous suspension comprising cellulosic fibres, hereinafter also referred to as "cellulosic suspension", or pumping the filler composition into a storage tank.

The mixing zone can be a pump, a static mixer, a tank suitable for mixing, e.g. a mixing chest of a paper or board making machine, or a zone in which streams of the filler, the anionic polysaccharide and the one or more cationic agents converge. Preferably the mixing zone is a pump or mixing tank. If the mixing zone is a pump, said pump is then preferably used to pump the obtained filler composition into the cellulosic suspension in the paper or board making process, or into the storage tank. If the mixing zone is a mixing tank, e.g. a mixing chest, the obtained filler composition is then suitably introduced by means of a pump into the cellulosic suspension in the paper or board making process, or into the storage tank. The storage tank may be any tank in which the filler composition is stored prior to shipping to a paper or board making machine, or any tank from which the filler composition is introduced by means of a pump into a cellulosic suspension in a paper or board making process.

The process may be conducted by feeding the one or more fillers, one or more anionic polysaccharides and one or more cationic agents in any order and in any pre-mix form to the mixing zone to form the filler composition. For example, the one or more fillers and the one or more anionic polysaccharides may be mixed in the mixing zone to form a filler pre-mix, and then the one or more cationic agents can be introduced into the mixing zone to be mixed with the filler pre-mix present therein to form the filler composition.

The process may also be conducted by mixing the one or more fillers and the one or more anionic polysaccharides in a filler pre-mixing zone to form a filler pre-mix, and then introducing the filler pre-mix into the mixing zone. The filler pre-mixing zone may be a pump, a static mixer, a tank suitable for mixing, e.g. a mixing chest of a paper or board making machine, or a zone in which a stream of the filler and a stream of the one or more anionic polysaccharides converge, e.g. by suitable arrangement of pipes through which the streams are fed. Preferably the filler pre-mixing zone is a pump or a static mixer. If the filler pre-mixing zone is a mixing tank, e.g. a mixing chest, the filler pre-mix is then suitably introduced by means of a pump into the mixing zone.

When two or more cationic agents are used in the process, e.g. first and second cationic agents, the process may be conducted by mixing the first cationic agent and the second cationic agent in a cationic agent pre-mixing zone to form a cationic agent pre-mix and then introducing the cationic agent pre-mix into the mixing zone. The cationic agent pre-mixing zone may be a pump, a static mixer, a tank suitable for mixing, e.g. a mixing chest of a paper or board making machine, or a zone in which a stream of the first cationic agent and a stream of the second cationic agent converge. Preferably the cationic agent pre-mixing zone is a pump or a zone in which streams of the first and second cationic agents converge, e.g. by suitable arrangement of pipes through which the streams are fed. If the cationic agent pre-mixing zone is a mixing tank, e.g. a mixing chest, the cationic agent pre-mix is then suitably introduced by means of a pulp into the mixing zone.

The invention preferably comprises the use of a pump. The term "pump, as used herein, means any pump or equipment having a pump effect. The use of one or more pumps as described above provides several benefits and makes it possible to easily adjust the dosage of filler, anionic polysaccharide and one or more cationic agents into the mixing zone, the dosage of filler composition into the cellulosic suspension and thus to adjust various properties of the paper or board produced, in particular paper and board thickness and filler content. Suitably, one or more pump having adjustable pump capacity are used in this process, in particular in the step of introducing the filler composition into the cellulosic suspension.

The process suitably also comprise providing a thickness specification for the paper or board to be produced, measuring the thickness of the paper or board being produced, e.g. in-line or manually during or after production, comparing the measured thickness with the thickness specification to identify any difference in thickness, and optionally reducing the thickness difference to provide paper or board meeting the thickness specification by adjusting the dosage of filler composition and thereby adjusting the filler content of the paper or board. Suitably, one or more computers and computer programs are used in measuring the thickness, comparing the measured thickness with the thickness specification, and reducing the thickness difference to provide paper or board meeting the thickness specification by adjusting the filler content.

In the process, the one or more fillers, one or more anionic polysaccharides, one or more cationic agents, filler composition, filler pre-mix and cationic agent pre-mix are preferably aqueous, i.e. they preferably contain water. Other components such as, for example, biocides, preservative agents, by-products of the production process of the filler, anionic polysaccharide and cationic agents, may of course also be present in the one or more fillers, one or more anionic polysaccharides, one or more cationic agents, filler composition, filler pre-mix and cationic agent pre-mix.

The one or more fillers, one or more anionic polysaccharides and one or more cationic agents, also collectively referred to herein as "the components", can be used in the process and present in the filler composition, filler pre-mix and cationic agent pre-mix in amounts which can vary within wide limits depending on, inter alia, type and number of components, intended use, desired filler content, desired cost savings, desired paper strength, etc.

The one or more fillers are usually present in the filler composition and filler pre-mix, if used, in an amount of at least about 1% by weight, based on the total weight of the filler composition or filler pre-mix, respectively, suitably at least about 2% by weight or at least about 5% by weight, and preferably at least about 10% by weight. The one or more fillers are usually present in the filler composition and filler pre-mix, if used, in an amount of up to 99% by weight, based on the total weight of the filler composition or filler pre-mix, respectively, suitably up to about 75% by weight or up to about 50% by weight, and preferably up to about 45% by weight.

The one or more anionic polysaccharides are usually present in the filler composition and filler pre-mix, if used, in an amount of at least about 1 kg/ton, based on the weight of the one or more fillers, suitably at least about 2 kg/ton, or at least about 3 kg/ton, and preferably at least about 5 kg/ton. The one or more anionic polysaccharides are usually present in the filler composition and filler pre-mix, if used, in an amount of up to about 100 kg/ton, based on the weight of filler, suitably up to about 50 kg/ton, or up to about 30 kg/ton, and preferably up to about 20 kg/ton.

The one or more cationic agents, e.g. first and second cationic agents, are usually present in the filler composition and cationic agent pre-mix, if used, in an amount of at least about 0.001 kg/ton, based on the weight of filler used in the process, suitably at least about 0.01 kg/ton, or at least about 0.1 kg/ton, and preferably at least about 1.0 kg/ton, and they are usually present in an amount of up to about 30 kg/ton, based on the weight of the one or more fillers, suitably up to about 15 kg/ton, or up to about 10 kg/ton, and preferably up to about 5 kg/ton. When the cationic agent is an aluminum compound, the amounts defined herein are calculated as $Al_2O_3$ based on the weight of the one or more fillers.

The filler composition usually has a weight ratio of cationic agents to the one or more anionic polysaccharides from about 10:1 to about 1:1000, suitably from about 2:1 to about 1:100, and preferably from about 1:1 to about 1:40.

Water is usually present in the filler composition and filler pre-mix, if used, in an amount of from about 1% by weight, based on the total weight of the filler composition or filler pre-mix, respectively, suitably at least about 25% by weight or at least about 50% by weight, and preferably at least about 55% by weight. Water is usually present in the filler composition and filler pre-mix in an amount of up to 99% by weight, based on the total weight of the filler composition or filler pre-mix, respectively, suitably up to about 98% by weight or up to about 95% by weight, and preferably up to about 90% by weight, the sum of percentages being 100.

According to the invention, the filler composition can be introduced into the cellulosic suspension in amounts which can vary within wide limits depending on, inter alia, type of cellulosic suspension, type of filler, type of anionic polysaccharide, type of cationic agents, type of paper produced, point of addition, etc. The filler composition is usually added to the cellulosic suspension in an amount of at least about 1 kg/ton, calculated as dry filler based on dry cellulosic fibres, suitably at least about 10 kg/ton or at least about 50 kg/ton, preferably at least about 100 kg/ton. The filler composition is usually added to the cellulosic suspension in an amount of up to 2000 kg/ton, suitably up to 1500 kg/ton, preferably up to 1000 kg/ton or 750 kg/ton, calculated as dry filler based on dry cellulosic fibres. Paper according to the invention usually has a filler content within the range of from 1 to about 67% by weight, suitably from about 5 to about 50, or from about 10 to about 40, preferably from about 20 to about 35, of from about 25 to about 35% by weight.

Preferably, the components used in the process are mixed in the mixing zone, the resulting filler composition is pumped to and introduced into the cellulosic suspension where the components of the filler composition are mixed with the cellulosic fibres, the obtained suspension is fed to a headbox which ejects the suspension onto a forming wire, whereby water is drained from the suspension to provide a wet cellulosic web or sheet containing the solid components of the filler composition, the web or sheet is then further dewatered and dried in the drying section of the paper or board making machine to provide filled paper or board. The process of the invention is preferably carried out continuously in a paper or board making machine.

In the process of the invention, other additives may of course also be used, either by being introduced into the cellulosic suspension, or applied to the web or sheet of paper or board obtained. Examples of such additives include conventional fillers, optical brightening agents, sizing agents, dry strength agents, wet strength agents, cationic coagulants, drainage and retention aids, etc.

Examples of suitable conventional fillers include the fillers mentioned above, suitably kaolin, china clay, titanium dioxide, gypsum, talc, natural and synthetic calcium carbonates, e.g. chalk, ground marble, ground calcium carbonate and precipitated calcium carbonate, hydrogenated aluminum oxides (aluminum trihydroxides), calcium sulphate, barium sulphate, calcium oxalate, etc. Examples of suitable wet strength agents include cationic polyamines and polyaminoamides, including the products obtained by reacting polyamines and polyaminoamides with epichlorohydrin.

Examples of suitable sizing agents include non-cellulose-reactive sizing agents, e.g. rosin-based sizing agents like rosin-based soaps, rosin-based emulsions/dispersions, cellulose-reactive sizing agents, e.g. emulsions/dispersions of acid anhydrides like alkyl and alkenyl succinic anhydrides (ASA), alkenyl and alkyl ketene dimers (AKD) and multimers, as well as anionic, cationic and amphoteric polymers of ethylenically unsaturated monomers, e.g. copolymers of styrene and acrylates. One or more sizing agents can be added to the cellulosic suspension, applied to the paper in a surface sizing application, or both. In a preferred embodiment, at least one sizing agent is added to the cellulosic suspension and at least one sizing agent is applied to the paper.

Examples of suitable cationic coagulants include cationic organic polymeric coagulants and cationic inorganic coagulants. Examples of suitable cationic organic polymeric coagulants include the cationic organic polymers mentioned above. Examples of suitable cationic inorganic coagulants include the cationic inorganic compounds mentioned above.

Examples of suitable drainage and retention aids include organic polymers, inorganic materials, e.g. anionic microparticulate materials, e.g. siliceous materials like colloidal silica-based particles, montmorillonite/bentonite, and combinations thereof. The term "drainage and retention aids", as used herein, refers to one or more additives which, when being added to a cellulosic suspension, give better drainage and/or retention than is obtained when not adding said one or more additives. The drainage and retention aids can be added to the cellulosic suspension prior to, simultaneously with, in between and after introducing the filler composition of the invention, preferable after introducing the filler composition into the cellulosic suspension.

Examples of suitable organic polymers include anionic, amphoteric and cationic starches; anionic, amphoteric and cationic acrylamide-based polymers, including essentially linear, branched and cross-linked anionic and cationic acrylamide-based polymers; as well as cationic poly(diallyldimethyl ammonium chloride); cationic polyethylene imines; cationic polyamines; cationic polyamideamines and vinylamide-based polymers, melamine-formaldehyde and urea-formaldehyde resins. Suitably, the drainage and retention aid comprises least one cationic or amphoteric polymer, preferably cationic polymer. Cationic starch and cationic polyacrylamide are particularly preferred polymers and they can be used singly, together with each other or together with other polymers, e.g. other cationic and/or anionic polymers. The weight average molecular weight of the polymer is suitably above about 1,000,000 and preferably above about 2,000,000. The upper limit of the weight average molecular weight of the polymer is not critical; it can be about 50,000,000, usually about 30,000,000 and suitably about 25,000,000. However, the weight average molecular weight of polymers derived from natural sources may be higher.

Silica-based particles, i.e. particles based on $SiO_2$ or silicic acid, are usually supplied in the form of aqueous colloidal dispersions, so-called sols. Examples of suitable silica-based particles include colloidal silica and different types of polysilicic acid, either homopolymerised or co-polymerised. The silica-based sols can be modified and contain other elements, e.g. aluminum, boron, nitrogen, zirconium, gallium, titanium and the like, which can be present in the aqueous phase and/or in the silica-based particles. Examples of suitable silica-based particles of this type include colloidal aluminum-modified silica and aluminum silicates. Mixtures of such suitable silica-based particles can also be used. Examples of suitable anionic silica-based particles include those having an average particle size below about 100 nm, preferably below about 20 nm and more preferably in the range of from about 1 to about 10 nm. As conventional in the silica chemistry, the particle size refers to the average size of the primary particles, which may be aggregated or non-aggregated. The specific surface area of the silica-based particles is suitably above about 50 $m^2/g$ and preferably above about 100 $m^2/g$. Generally, the specific surface area can be up to about 1700 $m^2/g$. The specific surface area is measured by means of titration with NaOH in a well known manner, e.g. as described by G. W. Sears in Analytical Chemistry 28(1956): 12, 1981-1983 and in the U.S. Pat. No. 5,176,891. The given area thus represents the average specific surface area of the particles. Further examples of suitable silica-based particles include those that are present in a sol having an S-value in the range of from 5 to 50%. The S-value can be measured and calculated as described by Iler & Dalton in J. Phys. Chem. 60(1956), 955-957. The S-value indicates the degree of aggregation or microgel formation and a lower S-value is indicative of a higher degree of aggregation.

Examples of suitable combinations of drainage and retention aids include cationic polymers and anionic microparticulate materials like siliceous materials, e.g. cationic starch and anionic colloidal silica-based particles; cationic acrylamide-based polymer and anionic colloidal silica-based particles; cationic acrylamide-based polymer, anionic acrylamide-based polymer and anionic colloidal silica-based particles or bentonite; and cationic acrylamide-based polymer and bentonite.

When using other additives in the process, these components can be added to the cellulosic suspension or applied to the paper in amounts which can vary within wide limits depending on, inter alia, type and number of components, type of cellulosic suspension, filler content, type of paper produced, point of addition, etc. Sizing agents are usually introduced into the cellulosic suspension and/or applied to the paper in amounts of at least about 0.01% by weight, suitably at least about 0.1% by weight, based on the weight of dry fibers, and the upper limit is usually about 2% by weight, suitably about 0.5% by weight. Generally, drainage and retention aids are introduced into the cellulosic suspension in amounts that give better drainage and/or retention than what is obtained when not using these aids. Drainage and retention aids, dry strength agents and wet strength agents, independently of each other, are usually introduced in an amount of at least about 0.001% by weight, often at least about 0.005% by weight, based on the weight of dry fibers, and the upper limit is usually about 5% by weight and suitably about 1.5% by weight.

The process can be used in the production of paper and board from different types of aqueous suspensions of cellulosic fibers and the suspensions should suitably contain at least about 25% by weight and preferably at least about 50% by weight of such fibers, based on dry substance. The suspension can be based on fibers from chemical pulp such as sulphate, sulphite and organosolv pulps, mechanical pulp such as thermo-mechanical pulp, chemo-thermomechanical pulp, refiner pulp and groundwood pulp, from both hardwood and softwood, and can also be based on recycled fibers, optionally from de-inked pulps, and mixtures thereof. Paper and board according to the invention can be used in numerous applications, and suitably the paper is used as writing and printing paper.

Example

The invention is further illustrated in the following example which, however, is not intended to limit the same. Parts and % relate to parts by weight and % by weight, respectively, and all suspensions are aqueous, unless otherwise stated.

The following components were used in the example, unless otherwise stated.

GCC: Ground calcium carbonate (Hydrocarb 60, Omya)
PAC: Polyaluminum chloride (Eka ATC 8210)
PA: Cationic polyamine (Eka ATC 4150)
CMC: Carboxymethyl cellulose, DS of anionic groups of 0.3-0.4 (Gabrosa 947, Akzo Nobel)
C-Starch: Cationic starch (Perlbond 970, Lyckeby)
C-PAM: Cationic polyacrylamide (Eka PL 1510)
Silica: Aqueous sol of anionic silica-based particles (Eka NP 442)

Paper sheets were made in a Dynamic Sheet Former (Formette Dynamique), supplied by Techpap SAS, France. The paper furnish used in the example was based on needle bleached kraft pulp (NBKP) and leaf bleached kraft pulp (LBKP). Consistency of the aqueous cellulosic suspension was 0.5% by weight and conductivity was adjusted to 0.5 mS/cm by addition of sodium sulphonate. The cellulosic suspension was stirred at a speed of 700 rpm and additions were made to the cellulosic suspension present in the mixing chest of a Dynamic Sheet Former followed by stirring.

In the process, a GCC filler slurry was fed to a mixing tank into which an aqueous CMC solution (1% by weight CMC) was introduced and mixed to form a homogeneous filler pre-mix. In parallel, PAC, PA and water were added to a pre-mixing tank to form a cationic agent pre-mix which was then introduced into the mixing tank whereupon the resulting filler composition having a solids content of 20% by weight was introduced by means of a pump having adjustable pump capacity into the cellulosic suspension 105 s before drainage. Drainage and retention aids were added to the obtained cellulosic suspension in the following sequence, dosages and time prior to drainage: C-Starch (8 kg/ton based on dry paper sheet) added 45 s before drainage, C-PAM (0.2 kg/ton based on dry paper sheet) added 15 s before drainage, Silica (0.5 kg/ton, calculated as $SiO_2$ and based on dry paper sheet) added 5 s before drainage. Paper sheets were formed by pumping the cellulosic suspension from the mixing chest through traversing nozzle into the rotating drum onto the water film on top of the wire, draining the stock to form a sheet, pressing and drying the sheet. The filler paper samples were conditioned in a climate room according to ISO 187: 1990 and thereafter evaluated by measuring grammage according to ISO 536:1995, thickness, tensile strength and tensile stiffness were measured by means of an Alwetron TH1 of Lorenzen & Wettre, Sweden, according to ISO 1924-2 and ISO 1924-3:2005 and Scott Bond was measured by means of a Scott Internal bond tester according to Tappi T 833 pm-94.

The below table shows the results obtained when adding the filler composition to the cellulosic suspension in varying amounts to get different filler contents of the paper samples. In Test Nos. 1-3, no filler composition was added. The dosages of CMC, PAC and PA are all based on dry GCC filler. GSM means grammage, MD means Machine Direction, and CD means Cross Direction.

TABLE

| Test No. | CMC kg/t | PAC kg/t | PA kg/t | GSM g/m² | Filler content wt. % | Thickness Mm | Scott Bond J/m² | Tensile strength MD kN/m | Tensile strength CD kN/m | Tensile stiffness MD kN/m | Tensile stiffness CD kN/m |
|---|---|---|---|---|---|---|---|---|---|---|---|
| 1 | — | — | — | 80 | 27.9 | 111.9 | 280 | 6.61 | 1.96 | 883.6 | 246.1 |
| 2 | — | — | — | 80 | 32.7 | 111.7 | 200 | 5.84 | 1.72 | 767.1 | 223.7 |
| 3 | — | — | — | 80 | 38.5 | 109.7 | 163 | 4.98 | 1.35 | 717.4 | 178.2 |
| 4 | 10 | 10 | 4 | 80 | 27.9 | 110.4 | 390 | 7.17 | 2.19 | 834.9 | 275.5 |
| 5 | 10 | 10 | 4 | 80 | 33.4 | 108.9 | 248 | 6.31 | 1.85 | 792.9 | 227.1 |
| 6 | 10 | 10 | 4 | 80 | 38.4 | 107.4 | 240 | 5.56 | 1.57 | 718.4 | 193.9 |
| 7 | 10 | 10 | 4 | 82 | 28.0 | 112.6 | 359 | 7.42 | 2.22 | 873.0 | 271.8 |
| 8 | 10 | 10 | 4 | 82 | 33.2 | 111.5 | 297 | 6.43 | 1.90 | 779.7 | 227.9 |
| 9 | 10 | 10 | 4 | 82 | 38.4 | 109.8 | 223 | 5.67 | 1.60 | 732.6 | 204.4 |
| 10 | 10 | 10 | 4 | 84 | 28.0 | 114.9 | 403 | 7.64 | 2.33 | 870.3 | 277.1 |
| 11 | 10 | 10 | 4 | 84 | 38.4 | 111.7 | 209 | 5.81 | 1.70 | 744.0 | 207.9 |
| 12 | 10 | 10 | 4 | 86 | 27.9 | 117.4 | 378 | 8.03 | 2.46 | 899.0 | 292.3 |
| 13 | 10 | 10 | 4 | 86 | 33.1 | 116.4 | 245 | 6.90 | 2.02 | 840.3 | 240.0 |
| 14 | 10 | 10 | 4 | 86 | 38.3 | 114.9 | 203 | 5.87 | 1.66 | 757.7 | 202.4 |
| 15 | 10 | 10 | 4 | 88 | 28.5 | 120.4 | 394 | 8.03 | 2.42 | 921.0 | 287.2 |
| 16 | 10 | 10 | 4 | 88 | 33.6 | 118.0 | 256 | 6.95 | 2.12 | 841.9 | 250.1 |
| 17 | 10 | 10 | 4 | 88 | 38.7 | 115.9 | 204 | 6.11 | 1.71 | 722.9 | 200.5 |
| 18 | 10 | 10 | 4 | 90 | 28.4 | 121.0 | 366 | 8.29 | 2.54 | 936.0 | 296.8 |
| 19 | 10 | 10 | 4 | 90 | 33.7 | 119.2 | 275 | 7.20 | 2.11 | 874.2 | 260.0 |
| 20 | 10 | 10 | 4 | 90 | 39.2 | 117.7 | 208 | 6.03 | 1.62 | 759.7 | 197.5 |

The table shows that the present invention makes it possible to increase the filler content of paper and board while substantially maintaining the thickness and substantially maintaining or increasing the strength properties.

The invention claimed is:

1. A process for the production of paper and board which comprises:
    (a) introducing one or more fillers, one or more anionic polysaccharides and one or more cationic agents into a mixing zone to form a filler composition, wherein
        (i) the one or more fillers and the one or more anionic polysaccharides are mixed in the mixing zone to form a filler pre-mix and then the one or more cationic agents are introduced into the mixing zone to form the filler composition, and/or
        (ii) the one or more fillers and the one or more anionic polysaccharides are mixed in a filler pre-mixing zone to form a filler pre-mix and then introducing the filler pre-mix into the mixing zone;
    (b) introducing by means of a pump the filler composition into an aqueous suspension comprising cellulosic fibers; and
    (c) dewatering the obtained suspension,
wherein said process further comprises:
    (d) providing a thickness specification for the paper or board to be produced;
    (e) measuring the thickness of the paper or board being produced,
    (f) comparing the measured thickness with the thickness specification to identify any difference in thickness; and
    (g) reducing the thickness difference to provide paper or board meeting the thickness specification by adjusting the dosage of filler composition and thereby adjusting the filler content of the paper or board.

2. The process of claim 1, wherein it comprises mixing the one or more fillers and the one or more anionic polysaccharides in the mixing zone to form a filler pre-mix and then introducing the one or more cationic agents into the mixing zone to form the filler composition.

3. The process of claim 1, wherein it comprises mixing the one or more fillers and the one or more anionic polysaccharides in a filler pre-mixing zone to form a filler pre-mix and then introducing the filler pre-mix into the mixing zone.

4. The process of claim 1, wherein the mixing zone is a pump, static mixer or mixing tank.

5. The process of claim 3, wherein the filler pre-mixing zone is a pump, static mixer or mixing tank.

6. The process of claim 1, wherein the pump has adjustable pump capacity.

7. The process of claim 1, wherein the one or more fillers comprise a mineral filler.

8. The process of claim 7, wherein the one or more fillers are selected from calcium carbonate, precipitated calcium carbonate, ground calcium carbonate, and mixtures thereof.

9. The process of claim 1, wherein the one or more anionic polysaccharides are selected from anionic starches, anionic cellulose derivatives and mixtures thereof.

10. The process of claim 9, wherein the one or more anionic polysaccharides comprise carboxy methyl cellulose.

11. The process of claim 9, wherein the one or more anionic polysaccharides have a degree of substitution of anionic groups up to 0.65.

12. The process of claim 1, wherein the one or more cationic agents comprise two or more cationic agents.

13. The process of claim 1, wherein the one or more cationic agents comprise a cationic organic polymer.

14. The process of claim 1, wherein the one or more cationic agents comprise a cationic inorganic compound.

15. The process of claim 1, wherein said process comprises mixing a first cationic agent and a second cationic agent in a cationic agent pre-mixing zone to form a cationic agent pre-mix and introducing the cationic agent pre-mix into the mixing zone.

16. The process of claim 1, wherein the one or more cationic agents are selected from cationic polyamines, cationic polyamideamines, cationic polyethylene imines, cationic dicyandiamide polymers, cationic acrylamide-based polymers, cationic acrylate-based polymers, cationic vinylamine/vinylformamide-based polymers, polymers based on diallyl dimethyl ammonium chloride, aluminium sulphate, sodium aluminate, potassium aluminate, polyaluminum chlorides, polyaluminum sulphates, polyaluminum silicate sulphates, and mixtures thereof.

17. The process of claim 1, wherein said process further comprises adding one or more drainage and retention aids to the aqueous suspension comprising cellulosic fibers prior to dewatering.

18. The process of claim 17, wherein it comprises introducing the filler composition into the cellulosic suspension and then adding one or more drainage and retention aids to the cellulosic suspension prior to dewatering.

19. The process of claim 17, wherein the one or more drainage and retention aids comprise a siliceous material.

20. The process of claim 17, wherein the one or more drainage and retention aids comprise a cationic polymer.

21. The process of claim 17, wherein the one or more drainage and retention aids comprise an anionic polymer.

22. The process of claim 1, wherein one or more computers are used in measuring the thickness, comparing the measured thickness with the thickness specification, and reducing the thickness difference to provide paper or board meeting the thickness specification by adjusting the filler content.

23. A process for the production of paper and board which comprises:
(a) introducing one or more fillers, one or more anionic polysaccharides and one or more cationic agents into a mixing zone to form a filler composition;
(b) introducing by means of a pump the filler composition into an aqueous suspension comprising cellulosic fibers; and
(c) dewatering the obtained suspension;
wherein said process further comprises:
(d) providing a thickness specification for the paper or board to be produced;
(e) measuring the thickness of the paper or board being produced,
(f) comparing the measured thickness with the thickness specification to identify any difference in thickness; and
(g) reducing the thickness difference to provide paper or board meeting the thickness specification by adjusting the dosage of filler composition and thereby adjusting the filler content of the paper or board.

24. The process of claim 23, wherein one or more computers are used in measuring the thickness, comparing the measured thickness with the thickness specification, and reducing the thickness difference to provide paper or board meeting the thickness specification by adjusting the filler content.

* * * * *